3,812,003
POLYURETHANE COMPOSITION AND LAMINATES MADE THEREWITH
William M. Larson, Hudson, and Newell R. Bender, Cuyahoga Falls, Ohio, assignors to The Goodyear Tire & Rubber Company, Akron, Ohio
No Drawing. Continuation-in-part of application Ser. No. 9,131, Feb. 11, 1970, which is a continuation of application Ser. No. 833,855, May 29, 1969, which in turn is a continuation of application Ser. No. 360,753, Apr. 17, 1964, all now abandoned. This application Jan. 12, 1972, Ser. No. 217,230
Int. Cl. B32b 7/04
U.S. Cl. 161—156                                       1 Claim

ABSTRACT OF THE DISCLOSURE

This invention relates to an adhesive for use in forming laminates of polyester impregnated fiberglass. This adhesive comprises a reaction mixture of 100 parts of a reactive hydrogen containing polymeric material of about 700 to 4500 molecular weight selected from the class consisting of polyester polyols, polyether polyols and polyester amides, an organic polyisocyanate, at least 5 parts to no more than about 200 parts of an inert powdery filler with the proviso that the filler shall not exceed that amount which renders the resulting mixture unspreadable and sufficient monomeric nitrogen containing polyol having 3 to 6 hydroxyls to be essentially equivalent to the excess polyisocyanate. Catalysts of the tin and amine type may be utilized, if desired. Amounts of 38, 52 and 80 parts of organic polyisocyanate per 100 parts of the polymeric material are some of the levels used in some of the examples.

---

This application is a continuation-in-part application of Ser. No. 9,131, filed Feb. 11, 1970, now abandoned, which was a streamlined continuation application of Ser. No. 833,855, filed May 29, 1969, now abandoned, which in turn was a streamlined continuation of application Ser. No. 360,753, filed Apr. 17, 1964, now abandoned.

This invention relates to polyurethane compositions and its use as a cement. More specifically, this invention relates to polyurethane compositions useful for adhering polyester coated fiberglass panels to form laminated bodies and to said laminates, without the need for a heat treatment.

It has been desirable for some time to make polyester impregnated fiberglass vehicular bodies but the vehicular bodies made of polyester impregnated fiberglass are relatively expensive to fabricate as no suitable method for rapidly assembling them on automated lines without pressure jigs were known. Hence, molded polyester fiberglass impregnated bodies have been used for the luxury line of automobiles; notwithstanding the fact that there has been considerable need for the use of non-metallic bodies in those areas where salt and other chemicals are used to melt snow and thus keep the roads passable.

It is an object of this invention to provide an adhesive which may be used to adhere polyester impregnated fiberglass parts and other materials together to permit ready assembly of vehicular bodies and other laminated structures.

This and other objects and advantages may be obtained by (a) forming a reaction mixture comprising (1) about 100 parts of a reactive hydrogen containing polymeric material having a molecular weight of about 700 to 4500 and preferably from about 1500 to 3000 selected from the class consisting of polyester polyols, polyether polyols and polyesteramides, (2) about 38 to about 80 parts of an organic polyisocyanate, (3) at least 5 parts to about 200 parts of an inert powdery filler provided in no cases the amount of filler shall exceed the amount which when mixed with 100 parts of the reactive hydrogen containing polymeric material, renders the resulting mixture unspreadable, (4) sufficient catalyst to achieve set of the reaction mixture in at least several hours and preferably one-fourth to one hour at about 75° F. and (5) sufficient monomeric nitrogen containing polyol having from 3 to 6 hydroxyls to be equivalent to the excess polyisocyanate relative to the reactive hydrogen containing polymeric material but preferably 0.5 to 0.9 mol for each 1.5 to 1.9 mols of excess polyisocyanate.

Two pieces of fiberglass mats or other building materials can be cemented together by spreading the above reaction mixture over at least one of the surfaces to be adhered and then pressing the two surfaces together until the reaction mixture has set.

The nature of this invention may be further appreciated from the following examples:

EXAMPLE I

The following ingredients: 100 parts of a polypropylene ether glycol having a molecular weight of about 2000 with one-tenth part of 1,2,4-trimethyl piperazine and .05 parts of dibutyl tin dilaurate, 10 parts of a reinforcing carbon black and 5 parts of a submicroscopic pyrogenic silica prepared in a hot gaseous environment by the vapor phase hydrolysis of silicon tetrachloride were intimately mixed to form mixture A. Then 38 parts of a polyisocyanate A prepared by the phosgenation of the reaction product of formaldehyde and aniline was added to mixture A and allowed to react to form a prepolymer. When the prepolymer was ready to be used 2.5 to 3.0 parts of N,N,N',N'-tetrakis (2-hydroxyl propyl) ethylene diamine was added to 15 parts of the prepolymer and intimately mixed therewith. The resulting liquid reaction mixture had a shelf life of 15 minutes and when used as an adhesive adhered two polyester impregnated fiberglass panels together and it required in excess of 60 pounds per square inch pull to tear the two panels apart. The adhesive when applied between the two panels cured sufficiently fast to permit the panels to be moved along a continuous assembly line and cured to a state requiring at least 60 pounds pull to separate the two panels without the application of heat or pressure.

EXAMPLE II

A prepolymer was formed by mixing and reacting 100 parts of a polypropylene glycol of about 2000 molecular weight containing 60 parts of carbon black, 0.01 part of 1,2,4-trimethyl piperazine and 0.05 parts of dibutyl tin dilaurate, with 52 parts of toluene diisocyanate. Then various amounts of triethanolamine were used to cure the prepolymer. When 6 grams of triethanolamine were used the resulting liquid reaction mixture cured and set within about 1–2 minutes. Another batch containing 2 grams triethanolamine which set in about 15 minutes was used to adhere two polyester fiberglass impregnated panels together.

Instead of the polyaryl polyisocyanates of Example I and the toluene diisocyanates of Example II, other isocyanates may be used, for exmple, 4,4'-diisocyanatophenyl-methane may be used. Also other tin compounds than the dibutyl tin dilaurate may be used. Representative tin compounds are dibutyl tin maleate, dialkyl tin dioctate, dibutyl in dibutyl mercaptide, dibutyl tin amyl mercaptide. The tin compounds may be represented by the formula $SnY_4$ where either one or all the Y's may be the same or different and y may be hydrocarbon radical, halogen, oxygenated or thionated hydrocarbons.

Instead of carbon black, other fillers may be used. Representative examples of these inert powdery fillers are clay, talc, asbestos, titanium dioxide, powdered calcium carbonate, whiting, zinc oxide, barytes, basic magnesium carbonate, water insoluble soaps, blanc fixe, aluminate, hydrated alkali silico aluminate and litherge. Normally the amount of filler may vary from a low of 5 to 10 parts to a high of 200 parts per hundred parts of reactive hydrogen containing compound with the preferred amount being about 50 to 100 parts. The amount of filler should be adjusted to give a paste which can be spread to give a smooth surface. This amount is related to density of the filler.

The presence of finely divided silica in weight ratio of 0.5 to 50 parts per 100 parts of reactive hydrogen containing polymeric material increases the modulus and gives better adhesion. For example, when 4 parts of Hi sil (a commercial porous silica) per 100 parts of polyether polyol was used in the recipe the adhesion increased from 60 pounds to 160 pounds with increases in the modulus, too. This is more specifically illustrated in Example III:

EXAMPLE III

| Recipe | A | B |
|---|---|---|
| Polypropylene ether glycol, M.W. 2,000 | 100 | 100 |
| Talc | 60 | 32 |
| Polyisocyanate A | 80 | 80 |
| Hi sil | | 4 |
| Curative B | 16 | 16 |
| Adhesion | 60# | 160# |

Polyisocyanate A is a product produced by phosgenation of a formaldehyde-aniline reaction product having about 40–50% of diisocyanate. Curative B was a mixture of 50 parts of polypropylene ether glycol of 2000 molecular weight, 100 parts of N,N,N',N'-tetrakis (2-hydroxyl propyl) ethylene diamine, 0.1 part of 1,2,4-trimethyl piperazine and 0.1 part of dibutyl tin dilaurate.

The data of Table 5 indicates the porous sponge-like silicas particularly enhanced the strength of the adhesive. The silicas useful as inert materials in this invention are not the same in physical properties with that of finely ground sand. The porous silica sponge-like fillers exerting particular enhancement of the pull strength are those having a particle size range of from about 1 to 20 microns average diameter and a bulk density of about 4 to about 18 pounds per cubic foot. One type of the porous silicas of this nature may be prepared by taking a refined quality sand having a very low iron content and containing about 99% $SiO_2$. The highly refined quality sand is fused with alkali to form sodium silicate. The sodium silicate is hydrolized by an acid such as sulfuric acid to silica gel. The gel is dehydrated and is then ground to a fine particle size in the range of from about 1 to 20 microns average diameter. The ground material is then further dehydrated by heating at 525 to 650° C. for about 12 hours to obtain the finely divided porous silicas. Also useful as porous silicas are diatomaceous silicas and ilicas aerogels.

EXAMPLE IV

A prepolymer was prepared by mixing 100 parts of polypropylene ether glycol of about 2000 molecular weight with 85 parts of talc coated with zinc stearate and 58.8 parts of toluene diisocyanate. An adhesive was formed by adding a curative comprising 16 parts of N,N,N',N'-tetrakis (2-hydroxyl propyl) ethylene diamine, 0.1 part of 1,2,4-trimethyl piperazine and 0.1 part dibutyl tin dilaurate to the above prepolymer. This adhesive was used to satisfactorily adhere large fiberglass panels in simulation of automatic body assemblies.

Representative members of the polyester polyols are the condensation products of a polycarboxylic acid or its anhydride with a polyol. Representative carboxylic acids are the aliphatic ones: adipic acid, glutaric acid, azelaic acid, and the aromatic ones: phthalic, terephthalic and isophthalic acids. Polyesters having more than 2 hydroxyls can be made by using higher functional carboxylic acids or polyols other than the lower glycols having 2 to 10 carbon atoms, for instance, glycerine or trimethylol propane. The polyether polyols are the glycols and higher hydroxyl terminated polyethers. Representative polyethers are polypropylene ether glycol or triol, polybutylene ether glycol, triol or higher.

The amount of tin catalyst usually will be from a low of about 0.0001 to 0.1 part per hundred parts of reactive hydrogen containing polymer with the preferred range being 0.005 to 0.05 parts.

Any of the usual polyurethane amine catalysts in the amount of 0.0001 to 0.1 part per 100 of reactive hydrogen containing polymer can be used to advantage with the tin catalyst.

Representative amine catalysts are the cyclic amines such as N-ethyl-morpholine, piperazine, 1,2,4-trimethyl piperazine and the tertiary amines such as triethylamine and trimethylamine.

Use of coated fillers is particularly desirable as these coatings seal the filler against moisture effects and facilitates incorporation of the filler in the reactive hydrogen containing polymeric material. Suitable sealants are the water insoluble soaps such as zinc stearate, the waxes, polyethylene and polypropylene.

While certain representative embodiments and details have been shown for the purpose of illustrating the invention, it will be apparent to those skilled in the art that various changes and modifications may be made therein without departing from the spirit or scope of the invention.

What we claim is:

1. A laminate characterized by requiring a pull in excess of 60 pounds per square inch to separate the laminate and consisting essentially of a layer of polyester impregnated fiberglass adhered to another layer of polyester impregnated fiberglass, said layers being adhered to each other with an adhesive comprising a reaction product of a mixture
    (1) of 100 parts of a reactive hydrogen containing polymeric material having a molecular weight of about 700 to 4500 selected from the class consisting of polyester polyols, polyether polyols and polyester amides,
    (2) about 38 to 80 parts of an organic polyisocyanate,
    (3) at least 5 parts to no more than about 200 parts of an inert powdery filler with the proviso that in no case shall the amount of filler exceed that amount which when mixed with a hundred parts of the reactive hydrogen containing polymeric material renders the resulting mixture unspreadable,
    (4) sufficient catalyst to achieve set of the reaction mixture in at least several hours at about 75° F., and
    (5) sufficient monomeric nitrogen containing polyol having from 3 to 6 hydroxyls to be about equivalent to the excess polyisocyanate relative to the amount of reactive hydrogen containing polymeric material.

References Cited

UNITED STATES PATENTS 3,148,162   9/1964   Gmitter et al. _____ 260—2.5

WILLIAM J. VAN BALEN, Primary Examiner

J. J. BELL, Assistant Examiner

U.S. Cl. X.R.

156—327; 161—DIG. 004, 190; 260—2.5